INVENTOR.
OLA PLAVEN

ATTORNEYS

United States Patent Office 2,913,114
Patented Nov. 17, 1959

2,913,114

PROCESS AND AN APPARATUS FOR SEPARATING SOLIDS FROM SUSPENSIONS OF SOLIDS IN FLUIDS

Ola Plavén, Brosarp, Sweden, assignor to Maskin Aktiebolaget Plavia, Stockholm, Sweden, a corporation of Sweden Application September 11, 1953, Serial No. 379,563

Claims priority, application Sweden October 14, 1952

7 Claims. (Cl. 209—273)

This invention relates to a process and an apparatus for separating solids from suspensions of solids in fluids.

Various processes can be used for separating solids from a suspension of the solid phase plus fluid phase type, such as screening in screening apparatuses having stationary or movable screens or separation of the solids in centrifuges or cyclone separators. In general the screening apparatuses differ fundamentally from the centrifuges and cyclone separators inter alia in that they permit separation of coarse solid particles from fine ones by selecting a screen having suitable perforations.

Cyclone separators or screening apparatuses are usually employed for separating solids from a suspension of the solid phase plus gaseous phase type.

Where screening apparatuses are concerned it is on the whole possible to distinguish between screening apparatuses having stationary screens and such apparatuses as have movable screens (e.g. vibrating screens). The latter have the advantage over the first-mentioned ones that the removal from the screen surface of the solids separated from the fluid takes place continuously and that the solid phase is obtained in a relatively dry condition.

As to centrifuges a distinction is made between discontinuously and continuously operating centrifuges. In discontinuously operating centrifuges the solid phase is separated discontinuously either by stopping the centrifuge cylinder and scraping out the solid phase which has been separated off at the cylinder wall, or by introducing special emptying tools into the centrifuge cylinder with or without changing the r.p.m. of the cylinder, while the fluid phase can be discharged either continuously during the separation or discontinuously immediately before the solid phase is discharged.

The continuously operating centrifuges usually have nozzles at the periphery of the centrifuge cylinder for the discharge of the solid phase. To prevent the nozzles from being clogged the solid phase must be held suspended in the liquid. In these centrifuges there is thus obtained only a concentration of the solids, for which reason a large quantity of free liquid is discharged together with the solid phase.

A centrifuge of another type has a conveyor worm operating within the centrifuge cylinder to continuously remove the solid phase, said conveyor worm discharging the solid phase separated off at the cylinder wall through one end of the cylinder.

The cyclone separators as hitherto used for suspensions of the solid phase plus liquid phase type have that disadvantage in common with the nozzle centrifuges that the solid phase has to be suspended in liquid in order to permit discharge thereof through the spouts of the cyclone separator. As compared with nozzle centrifuges and centrifuges with conveyor worms, the cyclone separators have the advantage of being very simple structurally and of not including any movable parts. They are therefore relatively cheap in manufacture and maintenance and extraordinarily simple to operate.

The cyclone separators hitherto used for suspensions of the solid phase plus gaseous phase type substantially have the disadvantage over the screening apparatuses that it is difficult, in the cyclone separators, to separate fine solid particles from coarse particles, the more so when the fine particles have a higher specific gravity than the coarse ones.

The present invention has for its object to combine the structural simplicity of the cyclone separators hitherto used and the compact construction of such separators and of the centrifuges with the good separating ability of the screening apparatuses having movable screens. The invention thus provides an apparatus, hereinafter designated "screening cyclone separator," which is similar, fundamentally, to cyclone separators of the customary type, but in which the walls of the screen are perforated to let through the fluid phase and possibly such minor solid particles as it is desired to have removed together with the fluid phase. If the screening cyclone separator is placed in such a way that the symmetry axis of its screen wall is directed substantially vertically, the solid phase falls down in the middle of the screen wall after the fluid has been separated off and its rotary movement has been braked as a result of the friction of the fluid against the screen wall. Should the symmetry axis of the screen wall deviate so much from the vertical that the solid phase cannot be discharged by itself, it can be removed by means of e.g. a conveyor worm or be blown away with e.g. air.

Further objects and advantages of the invention will appear from the following description of an embodiment thereof, reference being had to the accompanying drawing, in which.

Figure 1:
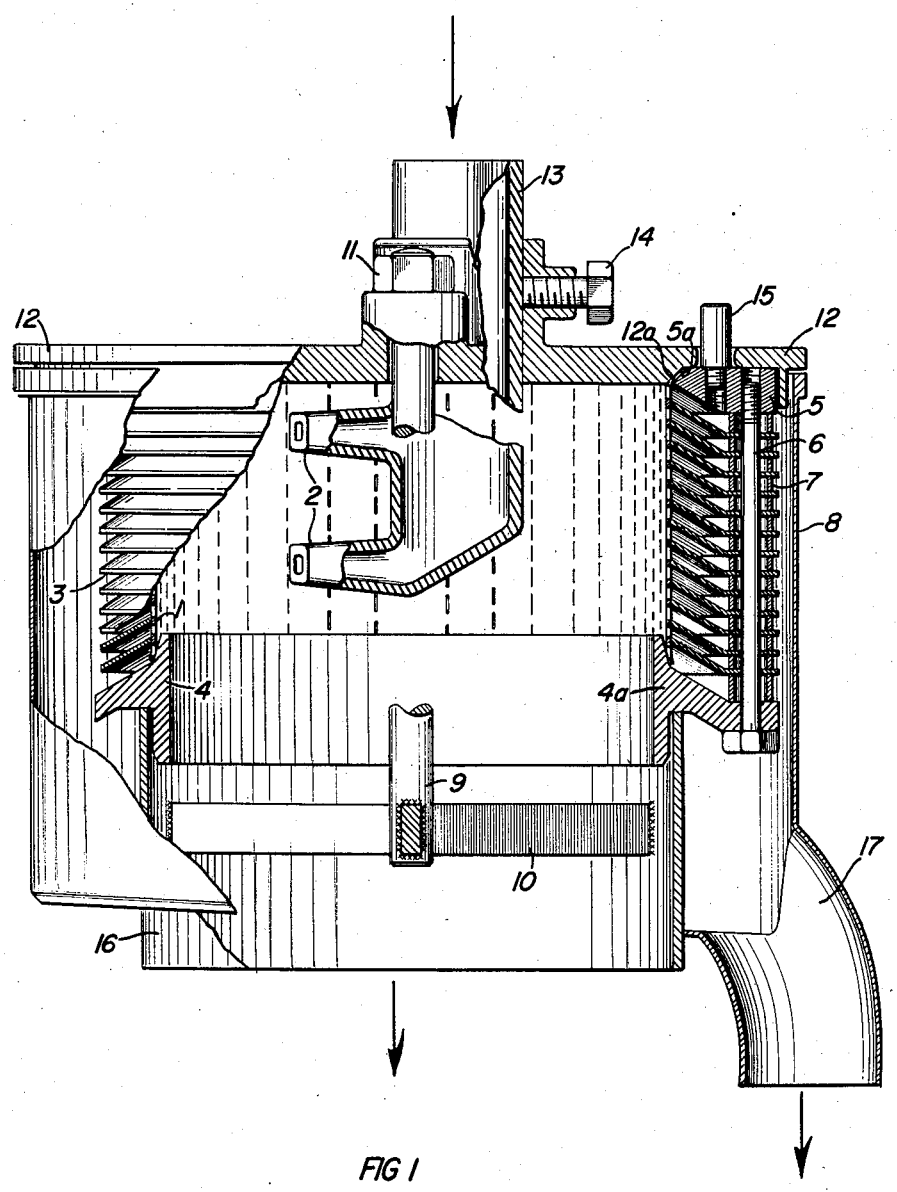
Fig. 1 is a vertical section of the apparatus.
Figure 2:
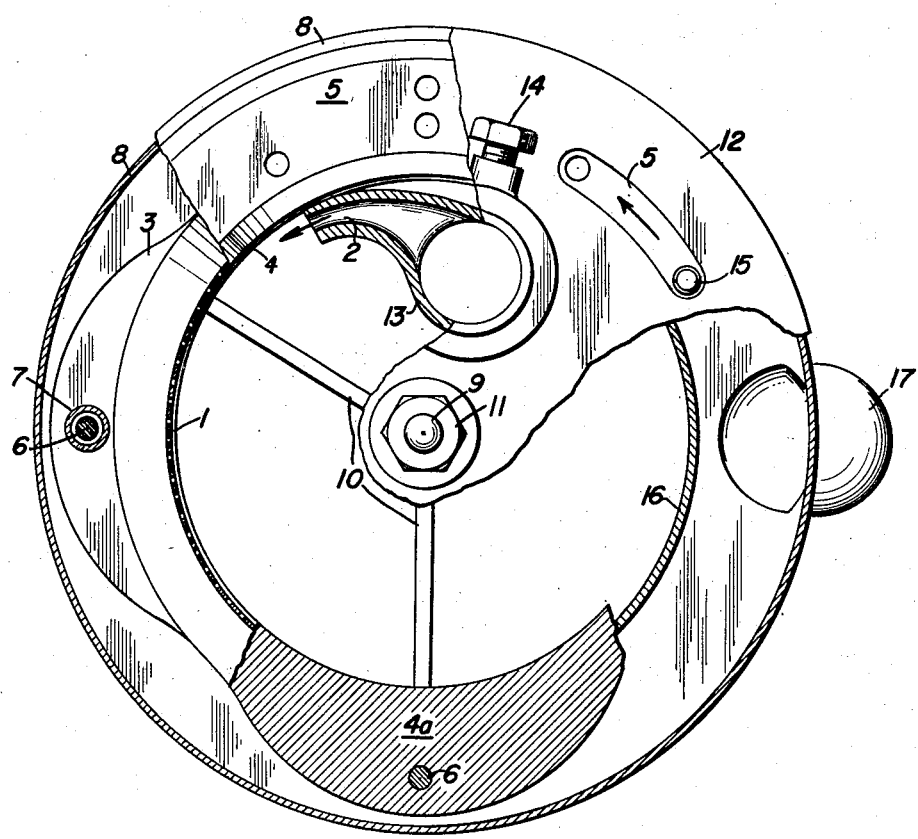
Fig. 2 is a plan view of the apparatus, certain parts being broken away.

The apparatus as shown consists of a cylindrical screen wall 1 held in place between the two screen holder ends 4 and 5 by pressing down the frusto-conical projection 12a of the cover 12 against the frusto-conical top part of the screen plate 1 and the frusto-conical inner ring 5a of the top end of the screen holder 5. The lower part of the screen cylinder fits tightly over a conical portion 4a on the lower end 4. The top end 5 and the lower end 4 are rigidly together by the bolts 6 and distance pieces 7, and the pressure by the cover 12 is brought to bear by tightening the nut 11 on the bolt 9, which at its lower end is fastened to the tailings discharge spout 16 by means of three cross rods 10.

In order to prevent filtrate from flowing downwards along the outside of the screen cylinder with the risk of its reentry into the inside of the cylinder, the screen can be provided with frusto-conical baffle plates 3 which are threaded upon the bolts 6 and spaced by the distance pieces 7.

The suspension to be screened is fed to the apparatus under pressure through the feed pipe 13 and ejected through the nozzles 2 onto the inside of the screen cylinder tangentially to the curvature of the screen and substantially perpendicular to a generatrix of the cylindrical screen. The filtrate passes through the screen wall and is collected in the receptacle formed by the housing 8 and the tailings discharge spout 16. From the receptacle the filtrate leaves the apparatus through the filtrate outlet spout 17. The pressure and thereby the speed of the suspension leaving the nozzles is adjusted in such a way that the oversize material travels not more than about ¾ of the full circumference of the screen cylinder in order to prevent the screened material from reentering the fresh feed. After losing its speed due to the friction against the screen wall, the oversize material (tailings) falls down through the tailings discharge spout 16.

In order to reduce the wear of the screen cylinder at the places where the jets from the nozzles hit the screen wall, the nozzles can be turned around now and then so that the full circumference will be evenly worn. The turning can be accomplished by loosening the nut 11 and turning the whole screen holding structure (1, 4, 5, 6, 7) by means of the turning pin 15. After turning, the screen holding structure is again locked by tightening the nut 11.

A lowering or raising of the position of the nozzles 2 relative to the screen wall also permits better utilization of the screen cylinder in respect of wear. By loosening the set screw 14 the feed pipe 13 with the nozzles can be raised or lowered into the desired position and locked there by again tightening the screw 14.

Figure 3:
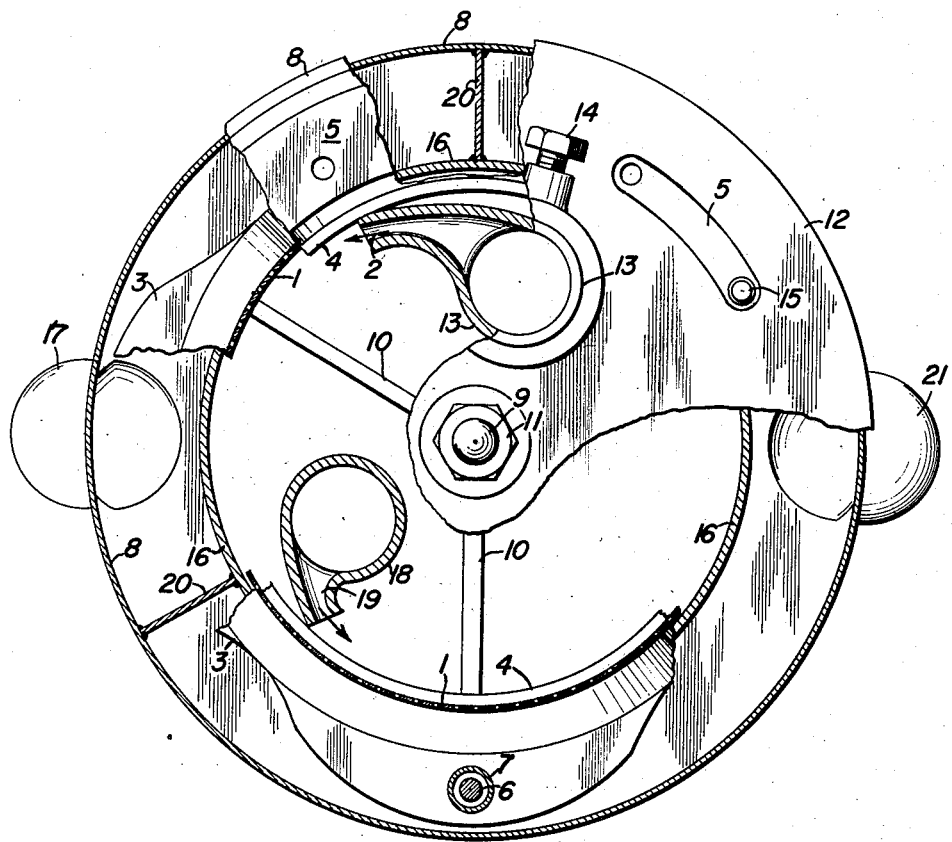
Fig. 3 is an additional plan view, partly broken away, showing means for injecting wash fluids and separate chambers in the filtrate receptacle for separating wash fluids from each other and from the mother fluid.

In Figure 3 feed pipe 18 and the nozzles 19 are used for spraying a wash fluid on the screened off tailings in the same direction as that in which the original suspension is sprayed, in order to remove more mother fluid or fine solids from the same. The filtrate obtained from the wash fluid is separated from the filtrate of the mother fluid by means of the separating walls 20 and is discharged through the spout 21.

In principle the screening cyclone separator substantially comprises a cylindrical screen which is curved at least in one direction, the suspension to be screened being conveyed at a suitable speed towards said screen wall 1 on the side of the screen wall facing the centre of curvature thereof, and substantially tangentially to the curvature of said screen and perpendicular to a generatrix of the cylindrical screen. By injecting the suspension at a certain speed in the tangential direction of the screen wall 1 the suspension is thus given a continuously deflecting or rotary motion. The suspension is therefore urged towards the screen wall with a force corresponding to the size of the angular speed of the particles. As a result of this pressure against the screen surface the fluid phase passes through the screen wall 1, while the solid phase after being braked by its friction against the screen surface falls downwards through the screen wall which opens downwardly.

As the degree of separation is dependent on the size of the pressure exerted by the suspension against the screen surface and therefore on the angular speed of the suspension particles, the desired degree of separation can be obtained by varying the speed at which the suspension is injected into the screen in the tangential direction thereof, and/or by varying the radii of curvature of the screen.

Instead of having e.g. a cylindrical and/or conical configuration the screen wall can also be given the form of a screw or helix, and the generatrixes of the screen wall can be parallel or directed substantially towards one or the same point or both, corresponding to the abovementioned cylindrical and/or conical screen wall. The suspension is supplied to the helical screen wall on the inside thereof and substantially tangentially thereto and either in the direction away from the centre of the helix and outwardly or in the opposite direction, depending on the character of the screening problem met with. A helical screen wall has the advantage that a long screen surface is obtained, while maintaining a small radius of curvature.

The speed at which the suspension is injected into the screening apparatus and which is necessary for the screening, can be obtained e.g. by injecting the suspension through one or more nozzles 2 directed substantially tangentially to the screen surface and as close as possible to the same. When more nozzles are used, they should preferably be disposed below each other, a lower nozzle being possibly displaced somewhat rearwardly with respect to the next higher nozzle, which results in the advantage that solid particles coming from a higher nozzle and whose speed has been braked do not fall down towards, and are caught in, the suspension flow from a lower nozzle and are thereby again suspended in said flow. The same result can also be obtained by using a somewhat greater ejecting speed for a higher nozzle as compared with that of a lower one.

In addition to the above advantages of the screening cyclone separator as compared with other screening apparatuses, the screening cyclone separator has the advantage that the perforations of the screen wall are not as easily clogged, which is due to the high speed of the solid particles parallel to the screen surface. Aggregates that may form are readily torn loose by the vigorous flow along the screen surface.

As a result of the higher pressure exerted on the screen surface one obtains in the screening cyclone separator a solid phase which is drier than that of e.g. vibrating screens.

To prevent liquid thrown out through the screen wall from flowing downwards along said wall and then back through the perforations in the lower part of the wall, frusto-conical rings 3 having the cone apex facing upwardly may be provided on the outer periphery of the screen wall when the latter is mounted with its symmetry axis vertically. Said frusto-conical rings bear against the screen wall and also serve as supports for said wall when it is manufactured from thin material.

The screen wall is preferably made rotatable relatively to the nozzles. Since the screen wall is exposed to most wear at those points where the jets from the nozzles strike the wall, said wall should be swung into another position after a certain period of time and be locked in this position so that it will be gradually subjected to wear on the entire inner periphery and be uniformly worn before an exchange of the screen is necessary. A displacement of the nozzles in a direction parallel to an adjacent generatrix of the screen wall, apart from a better utilization of the screen wall from the view point of wear, serves the purpose of adjusting the nozzle into the most favourable position for the screening problem met with in every single case.

The above screen wall can comprise one or more layers of perforate material. In cases where soft materials form the layers of the screen wall a strong material, e.g. perforate sheet metal, should be used as a support for the soft screen wall. To vary the throughflow area of the perforations said layers can be arranged so as to enable interadjustment and interlocking.

To remove as much as possible of the original suspension fluid from the separated solid particles, they can be resuspended in a wash fluid and be separated again in a screening cyclone separator. This procedure may be repeated in several steps, until the desired purity has been obtained. The same procedure is also used to extract, from the solid particles, soluble and/or volatile constituents, or to release and separate fine solid particles from coarse particles. However, the solid particles can also be washed or extracted in the first screening cyclone separator, special washing nozzles being used for this purpose. Such washing nozzles can suitably be arranged so as to flush the solid particles after they have been freed from the main part of the suspension fluid but before their rotary movement has been altogether braked. By directing the wash fluid in the same direction as the direction of motion of the solid particles and by giving the wash fluid a sufficient ejecting speed, it is possible to obtain a good centrifugation also of the wash fluid.

To prevent the suspension fluid and the wash fluid from mixing or, when several washing nozzles are used after one another, the different wash fluids from mixing when the washing takes place in one and the same screening cyclone separator the discharge of fluid outside the screening wall can be divided into two or more separate discharging systems.

When a screening of e.g. sticky impurities from the suspension is carried out with a fine-mesh screen wall, e.g. filter cloth, the screen wall is easily clogged. This disadvantage can be eliminated in part for instance by flushing the screen wall during operation, possibly in connection with a brushing or scraping thereof. On effecting such a cleaning the screen wall should be continuously rotated relatively to the injecting nozzles and the flushing and other cleaning tools.

The cleaning of the apparatus can also be performed with compressed air or flushing liquid which, possibly combined with a vibrating of the screen wall, is led in the direction opposed to the normal operating direction.

Such a continuous movement of the screen wall relatively to the ejecting nozzles is also advantageous in that the screen wall is worn uniformly throughout when suspensions including particles having a heavy wearing effect are screened.

Of course, the invention is not limited to the embodiment described above and shown in the drawing, but can be varied in various ways without departing from the inventive idea such as it is defined in the appendant claims.

What I claim and desire to secure by Letters Patent is:

1. A screening apparatus for separating solids suspended in fluids and for separating suspended coarse solids from fine solids and from the fluid in which they are suspended, comprising a housing, a perforate wall mounted in said housing so as to be fixed therein and being curved in at least one direction and serving as a screen, inlet means on said housing for supplying the suspension to be separated in said apparatus, ejecting means mounted on said inlet means so as to be fixed relative to said housing and disposed on that side of said perforate wall where the center of curvature thereof is situated, said ejecting means being directed substantially tangentially to said perforate wall and perpendicular to a generatrix of said wall for ejecting a suspension against said wall, whereby the fluid phase of said suspension is urged through the perforations of said perforate wall, while the solid phase of the suspension is retained within said perforate wall, and outlet means for separately discharging said fluid and solid phases, and a second inlet means on said housing for supplying wash water to said apparatus, a second ejecting means mounted on said second inlet means and disposed on that side of said perforated wall where the center of curvature is situated and spaced circumferentially of said curved wall from said suspension ejector means, said second ejecting means also being directed tangentially to the curvature of said perforated wall and perpendicular to a generatrix of the curvature of said wall.

2. A screening apparatus for separating solids suspended in fluids and for separating suspended coarse solids from fine solids and from the fluid in which they are suspended, comprising a housing, a perforate wall in said housing curved in at least one direction and serving as a screen, inlet means on said housing for supplying the suspension to be separated in said apparatus, ejecting means on said inlet means disposed on that side of said perforate wall where the center of curvature thereof is situated, said ejecting means being directed substantially tangentially to said perforate wall and perpendicular to a generatrix of said wall for ejecting a suspension against said wall, whereby the fluid phase of said suspension is urged through the perforations of said perforate wall, while the solid phase of the suspension is retained within said perforate wall, means for adjusting said perforate wall and said ejecting means in relation to each other whereby said perforate wall may be subjected to wear on its entire inner periphery by the fluid jets of said ejecting means and whereby said ejecting means can be set in the most favorable position for the suspension to be screened, means for locking said perforate wall and said ejecting means in the adjusted position, and outlet means for separately discharging said fluid and solid phases.

3. A screening apparatus for separating solids suspended in fluids and for separating suspended coarse solids from fine solids and from the fluid in which they are suspended, comprising a housing, a perforate wall in said housing curved in at least one direction and serving as a screen, inlet means on said housing for supplying the suspension to be separated in said apparatus, ejecting means on said inlet means disposed on that side of said perforate wall where the center of curvature thereof is situated, said ejecting means being directed substantially tangentially to said perforate wall and perpendicular to a generatrix of said wall for ejecting a suspension against said wall, whereby the fluid phase of said suspension is urged through the perforations of said perforate wall, while the solid phase of the suspension is retained within said perforate wall, said perforate wall and said ejecting means being adjustable about the center of curvature of said perforate wall to permit a relative adjustment of said parts so that said perforate wall will be subjected to wear on its entire inner periphery by the fluid jets of said ejecting means and that said ejecting means can be set in the most favorable position for the suspension to be screened, means for locking said perforate wall and said ejecting means in the adjusted position, and outlet means for separately discharging said fluid and solid phases.

4. A screening apparatus for separating solids suspended in fluids and for separating suspended coarse solids from fine solids and from the fluid in which they are suspended, comprising a housing, a perforate wall in said housing curved in at least one direction and serving as a screen, inlet means on said housing for supplying the suspension to be separated in said apparatus, ejecting means on said inlet means disposed on that side of said perforate wall where the center of curvature thereof is situated, said ejecting means being directed substantially tangentially to said perforate wall and perpendicular to a generatrix of said wall projecting a suspension against said wall, whereby the fluid phase of said suspension is urged through the perforations of said perforate wall, while the solid phase of the suspension is retained within said perforate wall, said perforate wall and said ejecting means being movable along a generatrix of said perforate wall lying adjacent the mouths of said ejecting means to permit a relative adjustment of said parts so that said perforate wall will be subjected to wear on its entire inner periphery by the fluid jets of said ejecting means and that said ejecting means can be set in the most favorable position for the suspension to be screened, means for locking said perforate wall and said ejecting means in the adjusted position, and outlet means for separately discharging said fluid and solid phases.

5. A screening apparatus for separating solids suspended in fluids and for separating suspended coarse solids from fine solids and from the fluid in which they are suspended, comprising a housing, a perforate wall in said housing curved in at least one direction and serving as a screen, inlet means on said housing for supplying the suspension to be separated in said apparatus, ejecting means on said inlet means disposed on that side of said perforate wall where the center of curvature thereof is situated, said ejecting means being directed substantially tangentially to said perforate wall and perpendicular to a generatrix of said wall for ejecting a suspension against said wall, whereby the fluid phase of said suspension is urged through the perforations of said perforate wall, while the solid phase of the suspension is retained within said perforate wall, partition means on that side of said perforate wall which is remote from the ejecting means for dividing the space outside said perforate wall into several separate chambers, and outlet means for each of said chambers and for said space within said curved wall for separately discharging said fluid and solid phases.

6. A process of separating solids suspended in fluids and suspended coarse solids from fine solids and from the suspension fluid by screening, comprising causing the suspension which is to be screened to flow against the inside of a fixed screen curved in at least one direction, the flow being in a direction substantially tangential to the curvature of the screen and perpendicular to a generatrix of the curvature of the screen for causing the suspension to be deflected continuously along the screen by the angular speed of the suspension fluid and for causing the fluid and solids in the fluid of a size smaller than the perforations in the screen to pass outwardly through the screen, leading the fluid away from said screen, causing wash fluid to flow against the inside of said screen on the separated solids after substantially all of the suspension fluid has passed through the screen and while the separated solids are still moving along said screen, said wash fluid being caused to flow against the inside of said screen in the same direction as said suspension and to strike said screen at a point circumferentially spaced from the point at which the suspension strikes the screen, and leading said separated solids and washing fluid away from the screen separately from the suspension fluid.

7. A process as claimed in claim 6 in which said wash fluid is caused to flow at a speed greater than the speed of the solids when it meets the solids.

References Cited in the file of this patent

UNITED STATES PATENTS

| | | |
|---|---|---|
| 526,334 | Volm | Sept. 18, 1894 |
| 715,212 | Phillips | Dec. 2, 1902 |
| 802,651 | Meadon | Oct. 24, 1905 |
| 846,649 | Curatolo | Mar. 12, 1907 |
| 973,149 | Warner | Oct. 18, 1910 |
| 1,108,542 | Anderson | Aug. 25, 1914 |
| 1,571,736 | Reed | Feb. 2, 1926 |
| 1,735,479 | Sturtevant | Nov. 12, 1929 |
| 1,769,586 | Luense | July 1, 1930 |
| 1,807,891 | Bottorff | June 2, 1931 |
| 2,219,453 | Mosley | Oct. 29, 1940 |
| 2,312,545 | Haug | Mar. 2, 1943 |

FOREIGN PATENTS

| | | |
|---|---|---|
| 515,859 | Belgium | Dec. 15, 1952 |